United States Patent [19]
Takigawa

[11] 3,807,843
[45] Apr. 30, 1974

[54] DEVICE CONCURRENTLY USED AS AN AUTOMATIC EXPOSURE CONTROLLER AND A SHUTTER IN A CAMERA

[75] Inventor: Tomoshi Takigawa, Kanagawa-kem, Japan

[73] Assignee: Canon Kabushiki Kaisha, Tokyo, Japan

[22] Filed: Dec. 18, 1972

[21] Appl. No.: 315,985

[30] Foreign Application Priority Data
Dec. 20, 1971   Japan.............................. 46-103485

[52] U.S. Cl................................ 352/141, 352/204
[51] Int. Cl.............................................. G03b 7/08
[58] Field of Search........................... 352/141, 204

[56] References Cited
UNITED STATES PATENTS

| | | | |
|---|---|---|---|
| 3,419,325 | 12/1968 | Mayr............................ | 352/141 X |
| 3,435,747 | 4/1969 | Yoshiyama..................... | 352/141 X |
| 3,554,633 | 1/1971 | Sekine............................. | 352/141 |
| 3,322,485 | 5/1967 | Williams........................ | 350/160 LC |
| 3,499,702 | 3/1970 | Goldmacher.................. | 350/160 LC |

*Primary Examiner*—Monroe H. Hayes
*Attorney, Agent, or Firm*—McGlew and Tuttle

[57] ABSTRACT

The device is used in a camera having film transport means intermittently advancing a film and a picture taking optical system. A stationary element, having a light transmission factor variable in accordance with the magnitude of an applied voltage, is interposed in the path of light passing through the optical system to the film, and a light beam splitter is positioned between the stationary element and the film to split the light into a beam directed to the film and another beam incident upon a photo-electric converter. A voltage controller connects the converter to the stationary element to control the light transmission factor thereof in accordance with light incident upon the converter. An electrical signal generator, such as a pulse generator, is connected to the film transport means and generates output pulses intermittently in accordance with stepwise advancing of the film by the transport means. The output of the pulse generator is connected to the voltage controller to control the operating time of the voltage controller in accordance with operation of the film transport means to interrupt operation of the controller, to block light transmission through the stationary element, during each stepwise advance of the film by the film transport means. Thereby, the stationary element functions simultaneously as an automatic exposure control and as a shutter for the camera.

11 Claims, 3 Drawing Figures

3,807,843

DEVICE CONCURRENTLY USED AS AN AUTOMATIC EXPOSURE CONTROLLER AND A SHUTTER IN A CAMERA

BACKGROUND OF THE INVENTION:

a. Field of the Invention:

This invention relates to a device functioning simultaneously as an automatic exposure controller and as a shutter in a camera, particularly to such a device including an element having light transmission factor variable in accordance with a controllable under applied voltage applied thereto, and including means controlling the magnitude and duration of the applied voltage.

b. Description of the Prior Art:

Camera shutters have been improved recently so that they can electronically compute the exposure time. However, the opening and the closing of light path are still effected mechanically. Accordingly, since the shutter opening and closing mechanism and the electric circuit are electromagnetically connected, complication and problems such as difficulty of maintainance, high cost etc. are unavoidable.

SUMMARY OF THE INVENTION:

It is an object of this invention to provide a completely stationary shutter not using any moving part, such as a shutter blade or curtain, as well as the usual mechanical iris diaphragm, and thus to provide a camera which is free from the above mentioned disadvantages.

Another object of the invention is to provide a device functioning simultaneously as an automatic exposure controller and as a shutter in a camera, comprising an element, whose light transmission factor varies according to the intensity of voltage applied thereto, in the photographic light path, a control means for controlling the light transmission time and the light transmission factor of the element, and a means controlling the operation of the control means in accordance with operation of a film transport means.

Still another object of the invention is to provide a device functioning simultaneously as an automatic exposure controller and as a shutter in a camera, comprising an element, having a variable light transmission factor, for controlling the transmission of light to the film to provide an appropriate exposure in accordance with the brightness of an object, means providing a control signal synchronized with the film advance for controlling operation of the element, and means for converting the light flux in the camera optical system into electrical signals.

Other objects or features of the invention will appear from the detailed description given below in conjunction with accompanying drawings.

DESCRIPTION OF THE PREFERRED EMBODIMENTS:

The following is a detailed explanation of some embodiments, wherein the device according to the invention is applied to a motion picture camera.

Figure 1:
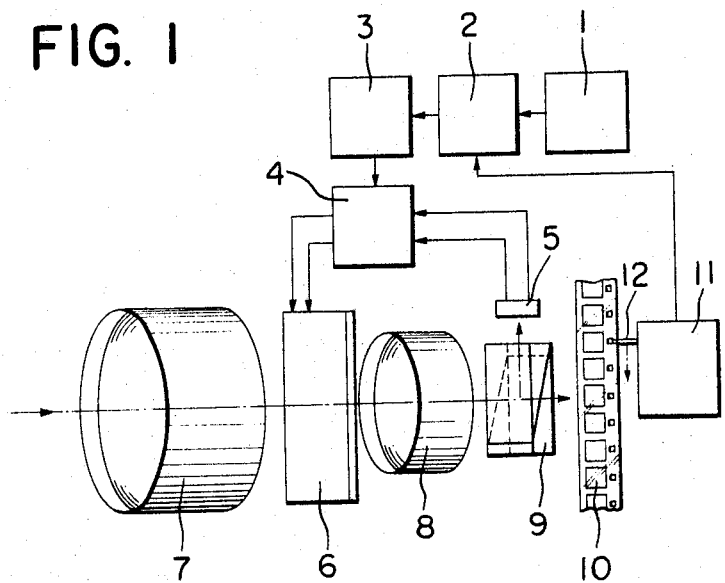
FIG. 1 is a block diagram of one embodiment, wherein a device functioning simultaneously as an automatic exposure controller and as a shutter in a camera, according to the invention, is applied to a motion picture camera.

In FIG. 1, an embodiment of the device according to the invention is shown by a block diagram, wherein 1 is an electric potential or voltage source, and 2 is a pulse generator, which is connected to the source 1 as well as to a film driving or transport means described hereinafter and generates output pulses responsive to input signals from the film transport means. 3 is an amplifier connected with pulse generator 2, 4 is a voltage controller including a known bridge circuit to adjust the voltage applied to an element 6 having variable light transmission factor as described hereinafter voltage controller 4 being operable for a given period of time in accordance with the output from amplifier 3 and in accordance with. the output signals from a photo-electric converter, mentioned later and to keep the latter input constant. 6 is an element having a light transmission factor which will vary according to the voltage or current applied thereto, this element being, for instance, liquid crystal or the like which is interposed in light path. The element 6 is connected to voltage controller 4, as well as being arranged to function simultaneously as a diaphragm and as a shutter between a variable magnification system 7, or zoom lens, and a relay system 8 which constitute a photographic optical system. A beam splitter 9 is arranged behind relay system 8 to divide the light flux into a first beam travelling along the optical axis to a film 10 and a second beam which is incident upon photo-electric converter 5. 11 is known film transporting mechanism which advances the film 10 stepwise by a feed pawl or finger 12 for film driving to effect a continuous shot.

The operation of the device will now be explained, with the first explanation referring to the automatic exposure adjustment. The light incident from an object, which has not been shown, is divided by beam splitter 9 into two beams, one of which is directed to photoelectric converter 5 which may be a well known type of photo-electric converter, such as one made of CdS or the like, and the light incident on converter 5 is converted to electrical signals to be supplied to, the voltage controller 4. This controller 4 includes a known bridge circuit as a comparison circuit and is connected in such a manner that the photo-electric converter 5 is a constituent element of its bridge circuit. When the voltage controller is working, a potentiometer and the like for changing the value of the electric potential applied to the voltage controller are adjusted until a constant value, which is determined by other correcting resistances of the bridge circuit, is attained, i.e., the voltage across the bridge becomes zero, to apply voltage to the element 6. Accordingly, the voltage applied from the voltage controller changes the light transmission factor of the element 6 in such a manner that an appropriate exposure is always given to the film 10 independently of the brightness of an object. Namely, when the brightness of an object is high, the transmission factor of the element 6 becomes small, and inversely, when the object is dark, the transmission factor of the element becomes large. Thus, the element 6 functions as a diaphragm.

Next, the working of the element 6, having a variable light transmission factor, as a shutter will be explained.

A means for detecting the time when the pawl or finger 12 of film transport mechanism 11 has finished advancing the film by one frame is provided in mechanism 11, and transmits a signal to pulse generator 2 which is thereby actuated to generate a pulse.

These pulses are amplified by the amplifier 3 and sent to applied voltage controller 4 to actuate the same.

The making operative of voltage controller 4 intermittently for limited periods of time may be effected in any desired manner, for example by controlling operation of voltage controller 4 by electrical signals having fixed time periods and supplied to the controller from pulse genarator 2. Alternatively, voltage controller 4 may be intermittently energized for fixed time periods responsive to the speed of film advance and a known circuit, such as the timer circuit. The arrangement in which the controller 4 is rendered operable for fixed periods by pulses supplied through an amplifier by a pulse genarator 2 triggered active by a signal generator 11 operable in accordance with the film advance is shown in FIG. 1. By so controlling voltage controller 4, the working time of the element 6, having the variable light transmission factor, may be limited by the duration of applied voltage, so that element 6 functions as a shutter and the time of exposure of the film 10 may be made constant, and the relation between this time and the light transmission factor will become apparent from FIG. 2.

Figure 2:
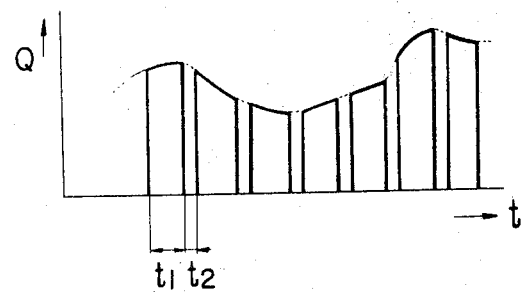
FIG. 2 is a graph showing a the change with time of the change of the light transmission factor of an element having variable a light transmission factor, in the device according to the invention as applied to a motion picture camera.

In FIG. 2, there is illustrated graphically how the light transmission factor Q, in the element 6 having a varialbe light transmission factor, will vary relative to the time $t$. In the drawing, $t_1$ is the time during which photographic light is transmitted, i.e., the time of exposure, and $t_2$ is the time when the transmission factor is zero, i.e., the time of non-exposure. In the motion picture camera, the numbers of photographic frame per second are fixed, so that $t_1$ and $t_2$ are constant. Therefore, the element 6 will vary its light transmission factor Q corresponding to the variation of brightness of the object and will always be able to give an appropriate exposure to the film by functioning as a diaphragm. In FIG. 2, the variation of value of the light transmission factor Q in one frame shot indicates that the exposure adjustment is done automatically. The slight variation of the light transmission factor in the time for one exposure indicates that the element 6 is correcting its light transmission factor by following, in a servo-like manner, the variation of output of the photo-electric converter 5 in one frame shot, which registers the brightness of an object and which brightness will delicately vary as time elapses.

The switching of such an element 6 from time $t_1$ to time $t_2$, namely the operation of making the transmission factor Q zero after the lapse of time $t_1$, is effected by the control of charging or operation time of voltage controller 4.

Figure 3:
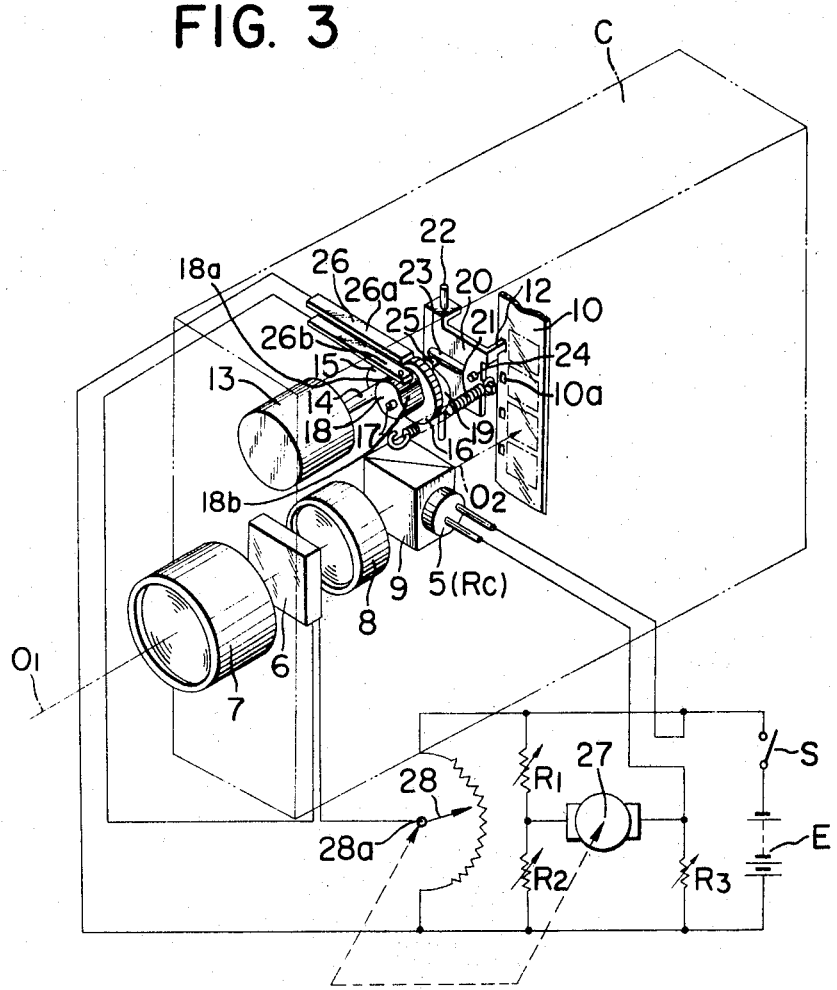
FIG. 3 is a perspective view showing another embodiment, wherein the device according to the invention is applied to a motion picture camera.

FIG. 3 is a perspective view of another embodiment of the invention, which is applied to a motion picture camera, in which C denotes a camera body. A photo-electric converter 5, an element 6 having variable light transmission factor, a variable magnification system 7, relay system 8, spectroscope 9, and film 10 are elements similar to those mentioned in the embodiment of FIG. 1.

In the film transporting mechanism, 13 is a motor connected with a source of electric potential (not shown), 14 is a motor shaft, 15 is a gear integrally attached to motor shaft 15 and 16 is another gear in mesh with gear 15 and rotates with its supporting shaft 17, which is attached to the camera body. 18 is a cam fixed to the gear shaft 17 and rotatable with the gear 16 supported by the shaft 17, and provided with a circular rise portion and a drop portion. On gear shaft 17, another face cam 19 is mounted and is rotatable with the gear 16. 20 is a holding member having a film feeding pawl or finger 12 and biased in the clockwise direction, in the drawing by a spring 21 of which one end is attached to the main body C, to turn around a shaft 22 which is supported by the main body. Holding member 20 has a slot 23 and a projection 24 opposing the cam face of face cam 19.

A pin 25 is secured to face cam member 19 to extend therefrom eccentrically to shaft 17, and rotates, with the face cam, eccentrically about the shaft 17, and in engagement with the slot 23 of holding member 20 to impart vertical movement to pawl or finger 12. The face cam 19 rotates with the shaft 17, and its cam face abuts against the projection 24 provided on the holding member. In accordance with to the shape of face cam 19. Pawl or finger is given engaging and disengaging motions with respect to perforations 10a of the film 10, namely a motion to rotate the holding member 20 around the shaft 22 is given.

Thus, when the driving motor 13 rotates, its motion is transmitted to the shaft 17, which rotates according to the gear ratio between the gears 15 and 16, and due to the rotation of this shaft 17, the eccentric pin 25 moves the holding member 20 vertically while, according to the shape of the face cam 19, holding member 20 is made to rotate, through the projection 24, in such a manner that the pawl or finger 12 engages and disengages perforations 10a of the film, so that by the combination of both motions, the film 10 may be fed intermittently. $0_1 - O_2$ is the photographic light path.

26 is a switching means which closes during the time corresponding to the rotation angle of the circular rise portion of the cam 18 fixed to the shaft 17, and comprises a switch for closing during sliding contact of a switch element with the circular rise portion of the cam 18.

To determine the time during which switch 26 is closed, the shape of cam 18 is selected in correspondence to the face cam 19 in such a manner that the closing time of switch 26 will be a fixed time determined by the selection of the numer of frames per second in accordance with the time required by the pawl or finger 12 to feed film 10 into the exposure position, and the time required for pawl or finger 12, when disengaged from a perforation 10a to be shifted back and engaged in the next perforation 10a.

The circuit connected with the switch 26 and the photo-electric converter 5 will now be explained. In FIG. 3, E is an electric potential source, S is a switch for electric potential source, and $R_1$, $R_2$ and $R_3$ are variable resistances which form respective sides of a commonly known bridge circuit together with photo-electric converter 5 (resistance value $R_c$). 27 is a reversible servo-motor connected across the bridge for detecting unbalanced input between the elements $R_1$, $R_2$ and $R_c$, $R_3$ of said bridge circuit, and the drive shaft of the servo-motor is operatively associated with a voltage variable device such as a potentiometer 28 or the like. The potentiometer 28 is connected with the electric potential source E, and an output terminal 28a of the potentiometer 28 is connected with the element 6 having the variable light transmission factor. When the bridge circuit is balanced, the relation between the elements becomes $R_c R_2 = R_1 R_3$, and when the bridge circuit is unbalanced, the electric current continues to flow until the resistance of element 6, as represented by potentiometer 28, satisfies, $R_c = R_1 R_3/R_2$, and the servo-motor 27 is rotated normally or reversely according to the direction of unbalanced current potentiometer 28 is controlled by the rotation of servo-motor to vary the output thereof, i.e., the voltage applied to the element 6. For instance, when the object is too bright, the transmission factor of the light ray to the film is adjusted to obtain an appropriate exposure, and when the object is too dark, the applied voltage is controlled to adjust by making the transmission factor of its light ray to the film to be larger, for obtaining a correct exposure. To obtain such an appropriate exposure, it is preferable that, in consideration of factors such as the sensitivity of photographic film, the speed of shot, etc., that respective values of variable resistances $R_1$, $R_2$, $R_3$ are set, and the light transmission factor of element 6 is thereby adjusted to satisfy $R_c = R_1 R_3/R_2$, and the resistance of photo-electric converter 5 is thus corrected. The voltage controller which controls the element 6 is formed by the bridge circuit, servo-motor 27 and potentiometer 28, etc. Such a voltage controller may be replaced by other known means, and the servo-motor may be replaced by a meter.

Switch 26 is used for controlling the working time of the voltage controller. The switch piece 26a of this switch 26 is connected with one terminal of electric potential source E, and another switch piece 26b thereof is connected with the other terminal of electric potential source E through the element 6, the potentiometer 28, and the switch S. The switch 26 closes the circuit during the time corresponding to the angle of rotation of the circular rise portion of the cam 18 which rotates with the shaft 17, and it is only during this time that the voltage controller is operated, so that the charged time of the element 6, of which the light transmission factor is controlled, may be controlled to give an appropriate exposure to the film 10. Thus, as mentioned above referring to FIG. 2, the element 6 is so designed that its light transmission factor becomes zero at the end of the fixed time $t_1$ and remains zero during the fixed time $t_2$, whereby the element 6 effects automatic exposure adjustment as well as operating as a shutter, and continuous shots, etc. may be effected.

In the above mentioned embodiment, signals from the film transporting mechanism are obtained through the cam 18 and the switch 26 slidable thereon to regulate the working time of the voltage controller. However, besides this method, any method may be suitably selected from known ones, for instance a method in which a microswitch or the like for detecting the shift of feed pawl or finger 12 is arranged on the film transporting mechanism to detect a film frame having attained an exposure position. It is understood that the device according to this invention is applicable to any camera having film transporting mechanism, for instance a motor drive mechanism of a still camera, to say nothing of a motion picture camera.

As mentioned above, this invention provides a device in which a known element having a variable light transmission factor functions simultaneously as a diaphragm and as a shutter, and the device may be operated without moving parts. Thus the above mentioned disadvantages due to the use of a mechanical shutter and a mechanical iris diaphragm may be effectively eliminated.

In addition the deterioration of image due to diffraction at the time of small diaphragm in a mechanical diaphragm may be completely eliminated. Further, when continuous shots are effected, by the interlocking with the film transporting mechanism, the pulse generator or by the switching means, the automatic exposure adjusting and a shutter means of a camera according to this invention may effectively perform shutter operation.

What is claimed is:

1. A device functioning simultaneously as an automatic exposure control and as a shutter, in a camera having film transport means intermittently advancing a film and a picture taking optical system, said device comprising, in combination, a static element, having a light transmission factor variable in accordance with the magnitude of an electric potential applied thereto, interposed in the path of light incident upon the film; a photo-electric converter operable to convert light incident thereon into an electrical signal; a light beam splitter positioned in the path of light passing through said static element and operable to direct light onto said photo-electric converter; a voltage controller connected to said photo-electric converter and controlling the electric potential applied to said static element in accordance with the light incident upon said photo-electric converter; and an electrical signal generator connected to said voltage controller and operatively associated with said film transport means to generate electrical output signals intermittently in accordance with stepwise advancing of the film by said film transport means; said signal generator controlling the operating time of said voltage controller in accordance with operation of said film transport means to interrupt operation of said voltage controller, to block light transmission through said stationary element, during each stepwise advance of the film by said film transport means.

2. A device, as claimed in claim 1, in which said static element is interposed in the path of light passing through said optical system to the film.

3. A device, as claimed in claim 1, in which said light beam splitter splits the light beam into a first beam, directed to the film, and a second beam incident upon said photo-electric converter.

4. A device, as claimed in claim 1, in which said voltage controller comprises a source of electric potential, and means operable to vary the potential of said source, as applied to said static element, in response to the electric signals from said photo-electric converter.

5. A device, as claimed in claim 4, in which said means operable to vary the potential of said source comprises a Wheatstone bridge circuit, and a potentiometer connected to said bridge circuit and operable in accordance with the voltage across said bridge circuit.

6. A device, as claimed in claim 4, wherein said means operable to vary the electric potential from said source applied to said static element comprises a Wheatstone bridge circuit, a servo-motor connected across the output of said bridge circuit for driving responsive to an unbalance of said bridge circuit, and a potentiometer driven by said servo-motor.

7. A device, as claimed in claim 1, in which said electrical signal generator comprises a pulse generator generating pulses intermittently in synchronism with the film transporting operation of said film transport means.

8. A device, as claimed in claim 7, in which said pulse generator comprises a normally open switch means closed intermittently in synchronism with the film transporting operation of said film transport means.

9. A camera capable of taking a continuous shot, and including a picture taking optical system and a film transport means, said camera comprising, in combination, a static light transmitting element interposed stationarily in the path of light passing through said optical system to the film, said static element having a first state in which it transmits variable intensities of light in accordance with electrical potentials applied thereto, and having a second state in which it interrupts transmission of light responsive to operation of said film transport means; photo-electric converter means positioned to have light directed through said optical system incident thereon to produce an electrical signal corresponding to the light incident thereon; means connected to said photo-electric converter means and controlling the electrical potential applied to said light transmitting element to vary the light transmitting condition thereof responsive to electrical signals from said photo-electric converter means; and switching means operatively associated with said film transporting means and operatively associated with said light transmitting means to switch said light transmitting means into its second state blocking light transmission, in sychronism with film transporting operation of said film transport means so that said light transmitting element operates also as a shutter during a continuous shot.

10. A camera, capable of taking a continuous shot, comprising, in combination, a picture taking optical system forming a picture taking light path; film transport means operable to transport a film for taking continuous shots; a static exposure control element, having a light transmitting factor variable in accordance with the magnitude of an electric potential applied thereto, interposed stationarily in said picture taking light path; a light beam splitter positioned in said picture taking light path for dividing the light flux to provide a branch of said light path for light measurement; photo-electric converter means positioned to sense the light flux in the branch path to convert the sensed light flux into electrical signals; signal generating means producing intermittent electric signals synchronized with the film transporting operation of said film transport means; and electrical signal applying means applying varying magnitude electric potentials to said static exposure control element to vary the light transmitting factor thereof to provide a proper exposure to the film in accordance with signals from said photo-electric converter means; said static exposure control element being switchable alternately between a first state, in which it operates as an automatic exposure control responsive to variation of the light transmission factor thereof, and a second state in which it interrupts light transmission when its light transmission factor becomes substantially zero; said signal generating means being connected to said static exposure control element to switch said static exposure control element to said second state responsive to film transporting operation of said film transporting means, to cause said static exposure control element to operate as a shutter.

11. In a motion picture camera having a film transporting means, a picture-taking optical system operable to transmit light to the film, light-measuring means operatively associated with the optical system and producing an electrical output corresponding to the magnitude of the light incident upon the film, and bridge-type circuit means responsive to the electrical output of said light-measuring means to produce an electrical signal indicative of the proper amount of light for exposing the film: the improvement comprising, in combination, light-transmission control means positioned in the light path between said picture-taking optical system and said light-measuring means in a static manner and operable to regulate the amount of transmitted light incident upon the film;

electrical field applying means connected to said light-transmitting control means and operable to vary the light transmission thereof in accordance with the applied electrical field, so that said light-transmitting control means serves as an automatic exposure control; and switch means connected to said electrical field applying means and operable by said film transporting means responsive to film transporting movement of the latter to control the duration of activation of said electrical field applying means, whereby to cause said light-transmitting control means to close the light path intermittently in accordance with the film transporting movement.

* * * * *